Oct. 23, 1934.  H. GATTY  1,977,762
GROUND SPEED AND DRIFT INDICATOR
Filed Nov. 7, 1931  3 Sheets-Sheet 1
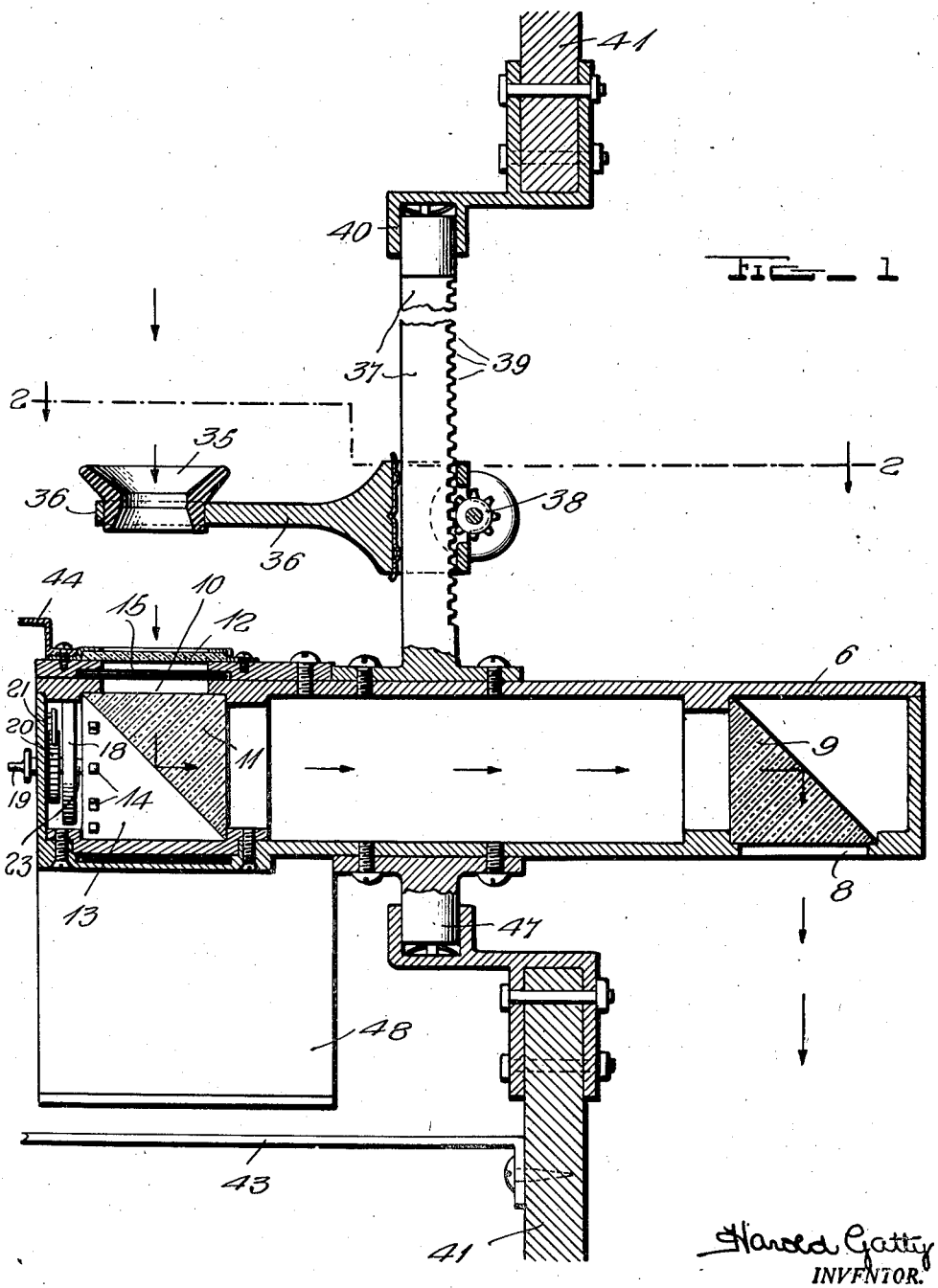
Harold Gatty
INVENTOR.

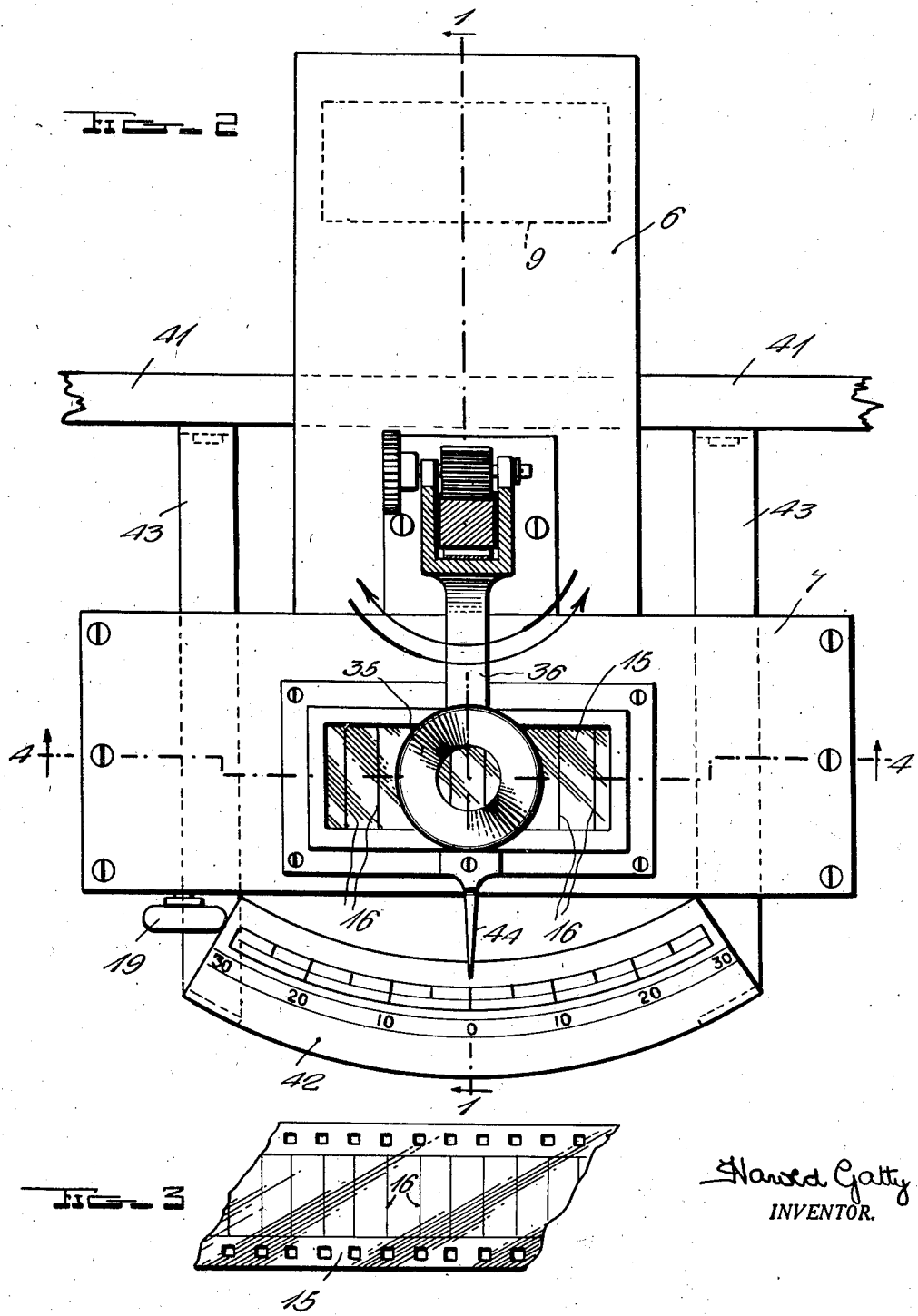

Oct. 23, 1934.  H. GATTY  1,977,762
GROUND SPEED AND DRIFT INDICATOR
Filed Nov. 7, 1931     3 Sheets-Sheet 3
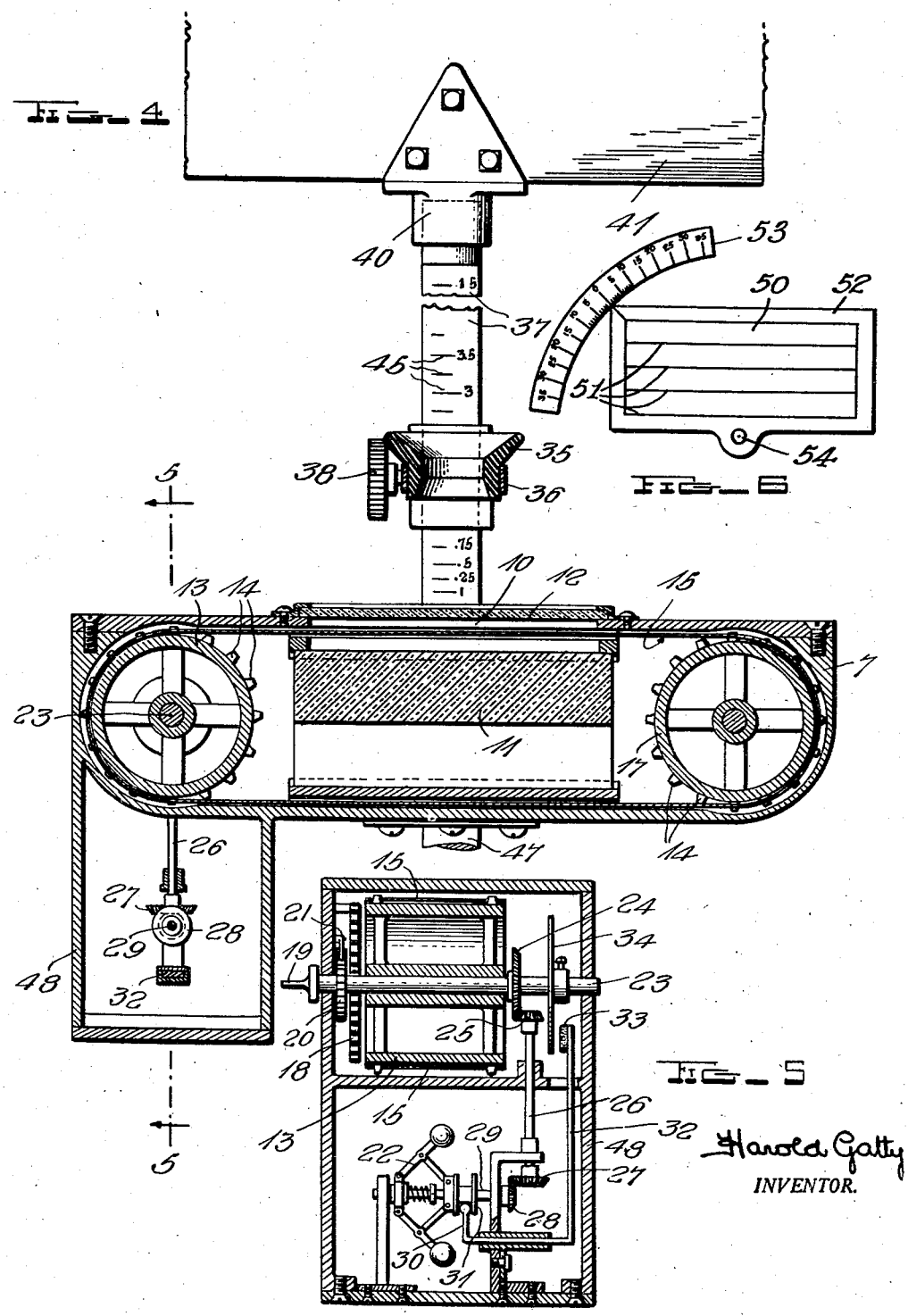

Patented Oct. 23, 1934

1,977,762

UNITED STATES PATENT OFFICE 1,977,762

GROUND SPEED AND DRIFT INDICATOR

Harold Gatty, Ocean Park, Calif.

Application November 7, 1931, Serial No. 573,683

6 Claims. (Cl. 88—1)

This invention relates to an instrument for determining the drift and the true ground speed of an aircraft.

It is the object of my invention to provide an instrument of the type mentioned that is simple in construction, and embodies means whereby errors in measured quantities due to the drift may be compensated to give the true speed of the craft with respect to the ground and at the same time measure the angle of drift.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Figure 1 is a sectional elevational view on the line 1—1, Figure 2;

Figure 2 is a top plan view of my invention;

Figure 3 shows a section of film with transverse marks that may be used in my device;

Figure 4 is a sectional view on line 4—4, Figure 2;

Figure 5 is a detail of one form of speed control for the film operating mechanism;

Figure 6 shows one means for measuring the drift angle.

The theory of my invention is as follows: An aircraft is provided with mechanism to move an index or reference mark at an invariable speed in the direction of the fore-and-aft line of the craft; when a reference subject below the craft, such as a house, a clump of trees, water etc., is viewed in conjunction with the index from a point such that the speed of the index is the same as the apparent speed of the subject i. e., their movements are synchronized, the distance of the observer's eye from the index bears the same ratio to the height of the craft above the subject as does the speed of the index to the speed of the craft with respect to the ground. This is accurately true, however, only when the apparent movement of the subject is parallel to the fore-and-aft line of the craft.

When the craft is drifting at an angle to the apparent course the ground speed of the craft is actually equal to the value obtained as above set forth divided by the cosine of the angle between the line of movement of the index and the apparent movement of the reference subject. The speed may be measured correctly by turning the mechanism carrying the index until the movement of the index is aligned with the apparent movement of the reference subject, and then taking the observations above mentioned. So far as I am aware this has not been done heretofore.

As shown in Figure 4, the case of the instrument, preferably made of light metal, may be substantially T-shaped, with a stem 6 and a head 7, though this form is susceptible to many variations. Opposite aperture 8 in one side of the stem 6 is a reflecting prism 9. Under window 10 in head 7 is a second prism 11, disposed to receive light from prism 9 and reflect it through the window, which is covered by a transparent plate 12.

In one end of head 7 is a roller 13 having teeth 14 to engage the regularly spaced apertures in an endless member 15 that passes over and is driven by roller 13. Member 15 is shown for purpose of illustration as being made of ordinary moving picture film with the emulsion washed off to make it transparent and with equally spaced transverse marks or indices 16 thereon, though this member may well be a pair of sprocket chains, one at each end of the rollers, connected by uniformly spaced transverse bars to serve as indices or any suitable equivalent. The endless member 15 also passes over an idler roller 17, spaced from roller 13, whereby the member 15 is held taut where it passes window 10.

Roller 13 is actuated by spring 18, which is wound by key 19, the unwinding of the spring without driving the roller being prevented by a ratchet wheel 20 engaged by a pawl 21 in a manner well known. The rotation of roller 13 is held constant by a governor mechanism 22 in housing 48 driven from shaft 23 of roller 13 by gear 24 engaged with pinion 25 on shaft 26 which also carries pinion 27 meshed with pinion 28 on shaft 29 of the governor. Yoke 30 engages a grooved collar 31 on the governor shaft and moves through lever 32, a friction pad 33 against disk 34 on shaft 23 when the speed becomes higher than the desired maximum. The driving and speed control mechanism shown are merely illustrative, as any other suitable mechanism may be used for this purpose, the important thing being that the member 15 moves at constant speed.

An image of the reference subject is reflected by prism 9 to prism 11, where it may be viewed in conjunction with the indices on member 15 by an observer with his eye at eye-piece 35. The eye-piece is preferably made of soft rubber to prevent injury to the observer when the air is "bumpy". Eye-piece 35 is carried by an arm 36 slidably mounted on a standard 37 attached at one end to the case, the arm carrying a pinion 38 engaged with rack 39 to adjust the position of the eye-piece with respect to the member 15. Standard 37 may have its free end journalled in a bearing 40 mounted on the fuselage 41 to steady the instrument on its pivotal support 47, also mounted on the fuselage. An arc 42, concentric with the pivotal mounting of the case and graduated in degrees, is carried by a bracket 43 in such position that a pointer 44 on the case of the instrument will move thereover when the instrument is rotated on its support, the zero point of the graduation being directly under the pointer when the line of movement of the member 15 is parallel to the fore-and-aft line of the craft.

A scale 45 is disposed to indicate the distance of the eye-piece 35 from the member 15. This scale may be on the standard 37, as shown, or on a separate member adjacent thereto. In the present instance the speed of member 15 is 0.22 inch per second, and this corresponds to a distance of the eye-piece from the member of one inch for each thousand feet of height of the craft above the reference subject, the height being determined in the usual manner.

The method of using the instrument is as follows: Due to the periscopic effect of the prisms 9 and 11 (the former being downwardly directed outside the fuselage) there is always a moving image of objects below the craft visible in window 10 past which the indices of member 15 are moving at constant speed in the same direction as the movement of the images, when the craft is travelling without drift and the movement of the member 15 is parallel to the fore-and-aft line of the craft. If now the eye-piece 35 be moved to such a distance from the member 15 that the movement of an index 16 coincides with the movement of the image of a reference subject the following ratios exist:

$$\frac{\text{speed of index}}{\text{ground speed}} = \frac{\text{height of eye above index}}{\text{height of craft above reference subject}}$$

From this relation I have shown that the ground speed equals $$\frac{0.15 \times H}{A}$$

in which H is the height of the craft, determined by the usual instruments, and A is the distance of the eye from the index, as shown by scale 45 when the movement of the images, i. e., when the apparent movement of the reference subject, is synchronized with the movement of the index.

However, as pointed out above, if the movement of the images has a component transverse to the line of the movement of the index, as occurs when the craft is drifting, the true ground speed is not given by the above computation, being to small by the factor $$\frac{1}{\cos a},$$

$a$ being the angle of drift. The true ground speed can be measured by rotating the device so that the movement of the indices is aligned with the line of movement of the images, the angle of rotation being shown by the position of pointer 44 on arc 42, and hence the angle of drift is obtained simultaneously with the correct ground speed.

The speed of the member 15 and the scale of eye distances therefrom were worked out as most suitable for flying conditions of an average ground speed of one hundred fifty miles per hour at a height of five thousand feet, but other units for these quantities may be found to be more satisfactory for other values of these quantities. It is obvious that since the factor 0.15 is constant it may be embraced in the calibration of scale 45, when the expression for computing the ground speed will be $$\frac{H}{A'},$$

in which A' is the reading on the modified scale.

In previously used devices of this type the speed of the indices is variable to synchronize their movement with the apparent movement of the reference subjects, but this is not satisfactory owing to the difficulty of measuring the speed accurately. In my instrument the only quantity varied is a distance which can easily be determined to any required exactitude.

If for any reason it may be undesirable to mount the instrument to be bodily rotatable, the angle of drift may be determined by placing a suitable device over the window 10 to measure that angle. One such device is a transparent plate 50 having parallel lines 51 ruled thereon and mounted in a frame 52 adjacent a fixedly mounted arc 53 graduated in degrees with the zero point of the graduation corresponding to a fixed point on the case when the lines are parallel to the line of movement of the indices, and a pivotal mounting 54 on the case at the center of curvature of the arc so that plate 50 can be positioned over window 10. If the apparent movement of the reference subjects is at an angle to the line of movement of the indices the plate is turned until the lines thereon are parallel to the line of movement of the images of the subjects, and the angle through which the plate is turned to effect the parallelism of the lines of the plate with the movement of the images is read on the arc at the side of the plate. This gives the angle of drift, and with it the true ground speed can be calculated by dividing the indicated ground speed by the cosine of the angle of drift.

It will be understood that the above description and accompanying drawings comprehend only the general and preferred embodiment of my invention, and that various changes in the construction, proportion and arrangements of parts may be made within the scope of the appended claims, without sacrificing any of the advantages of my invention.

I claim:

1. A navigation instrument, comprising a substantially T-shaped case having an aperture in one side of the stem of the T adjacent the free end thereof and a window in the head of the T on the side opposite said aperture, a roller in each end of said head, said rollers each having a series of teeth at each end, an endless member passing said window and around both said rollers having portions to engage said teeth and uniformly spaced transverse indices, a spring in one of said rollers connected to rotate the roller and thereby drive said member, speed governing means connected to keep the movement of said member constant, a prism disposed in said stem against the aperture therein to reflect light along said stem, a second prism disposed to receive light from the first prism and reflect said light through said member to said window, a standard extending upwardly from said case adjacent said window, an eye-piece disposed to view said window and mounted on said standard for movement longitudinally thereof, a scale disposed to indicate the distance of said eye-piece from said endless member, a pivotal mounting for said case, a fixed scale disposed adjacent the said head portion, and a pointer carried by said head to move over said fixed scale when said case is rotated.

2. A navigation instrument, comprising a case having an aperture in one side adjacent one end and a window in the opposite side adjacent the opposite end thereof, a roller at each end of said window disposed transversely of said window, an endless member having transverse equally spaced indices passing over both said rollers in driving engagement therewith, a prism in said case opposite said aperture, a second prism disposed to receive light from the first prism and reflect said light to said window through said member, a standard extending outwardly from said case adjacent said window, an arm movable longitudinally of said standard, an eyepiece carried by said arm to view said window, a scale to indicate the distance of said arm from said endless member, means to drive one of said rollers, means to keep the speed of said roller constant, a pivotal mounting for said case, and means to indicate the angular movement of said case when rotated on said mounting.

3. A navigation instrument, comprising a case having an aperture in one side adjacent one end and a window in the opposite side adjacent the opposite end thereof, a roller at each end of said window disposed transversely of said window, an endless member having transverse equally spaced indices passing over both said rollers in driving engagement therewith, a prism in said case opposite said aperture, a second prism disposed to receive light from the first prism and reflect said light to said window through said member, a standard extending outwardly from said case adjacent said window, an arm movable longitudinally of said standard, an eye-piece carried by said arm to view said window, a scale to indicate the distance of said arm from said endless member, means to drive said member at an invariable speed, a pivotal mounting for said case, and means to indicate the angular movement of said case when rotated on said mounting.

4. A navigation instrument, comprising a substantially T-shaped case having an aperture in one side of the stem of the T adjacent the free end thereof and a window in the head of the T on the side opposite said aperture, a roller in each end of said head, said rollers each having a series of teeth at each end, an endless member passing said window and around both said rollers having portions to engage said teeth and uniformly spaced transverse indices, a spring in one of said rollers connected to rotate the roller and thereby drive said member, speed governing means connected to keep the movement of said member constant, a prism disposed in said stem against the aperture therein to reflect light along said stem, a second prism disposed to receive light from the first prism and reflect said light through said member to said window, a standard extending outwardly from said case adjacent said window, an eye-piece disposed to view said window and mounted on said standard for movement longitudinally thereof, and a scale disposed to indicate the distance of said eye-piece from said endless member.

5. A navigation instrument, comprising a case having an aperture in one side adjacent one end and a window in the opposite side adjacent the opposite end thereof, a roller at each end of said window disposed transversely of said window, an endless member having transverse, equally spaced indices passing over both said rollers in driving engagement therewith, a prism in said case opposite said aperture, a second prism disposed to receive light from the first prism and reflect said light to said window through said member, a standard extending outwardly from said case adjacent said window, an arm movable longitudinally of said standard, an eye-piece carried by said arm to view said window, a scale to indicate the distance of said arm from said endless member, means to drive one of said rollers, means to keep the speed of said roller constant.

6. A navigation instrument, comprising a case having an aperture in one side adjacent one end and a window in the opposite side adjacent the opposite end thereof, a roller at each end of said window disposed transversely of said window, an endless member having transverse equally spaced indices passing over both said rollers in driving engagement therewith, a prism in said case opposite said aperture, a second prism disposed to receive light from the first prism and reflect said light to said window through said member, a standard extending outwardly from said case adjacent said window, an arm movable longitudinally of said standard, an eye-piece carried by said arm to view said window, a scale to indicate the distance of said arm from said endless members, and means to drive said member at an invariable speed.

HAROLD GATTY.